(12) United States Patent
Burckard

(10) Patent No.: US 8,452,009 B2
(45) Date of Patent: May 28, 2013

(54) CONTROL MESSAGE PROCESSING METHOD

(75) Inventor: Antoine Burckard, Montigny le Bretonneux (FR)

(73) Assignee: Nagra France SAS, Paris (FR)

( * ) Notice: Subject to any disclaimer, the term of this patent is extended or adjusted under 35 U.S.C. 154(b) by 903 days.

(21) Appl. No.: 12/302,611

(22) PCT Filed: May 29, 2007

(86) PCT No.: PCT/EP2007/055173
§ 371 (c)(1),
(2), (4) Date: Nov. 26, 2008

(87) PCT Pub. No.: WO2007/138042
PCT Pub. Date: Dec. 6, 2007

(65) Prior Publication Data
US 2009/0202072 A1    Aug. 13, 2009

(30) Foreign Application Priority Data

May 29, 2006   (EP) ..................................... 06290884

(51) Int. Cl.
*G06F 21/00*   (2006.01)
(52) U.S. Cl.
USPC .......................................... 380/210; 380/287
(58) Field of Classification Search
USPC ................................. 380/210, 287
See application file for complete search history.

(56) References Cited

U.S. PATENT DOCUMENTS

2002/0083438 A1* 6/2002 So et al. ........................ 725/31
2004/0268117 A1   12/2004 Olivier et al.

FOREIGN PATENT DOCUMENTS

| EP | 1447983 A1 * | 8/2004 |
|----|--------------|--------|
| WO | 03107665 A1 | 12/2003 |
| WO | WO 03107665 A1 * | 12/2003 |
| WO | 2004032410 A1 | 4/2004 |
| WO | 2004071091 A1 | 8/2004 |

* cited by examiner

*Primary Examiner* — Vivek Srivastava
*Assistant Examiner* — Helai Salehi
(74) *Attorney, Agent, or Firm* — DLA Piper LLP US

(57) ABSTRACT

A method for processing a set of control messages used to access an encrypted stream by a multimedia unit. These messages include a discrimination parameter having a different value for at least three consecutive non-redundant messages in the stream. The method includes the steps of receiving a current control message; reading the discrimination parameter from the current control message; retrieving from a memory the discrimination parameter from the message processed previously; comparing the current and previous discrimination parameters; and blocking said current control message if the comparison step indicates that the discrimination parameters are identical. The method is characterized in that the discrimination parameter is unique and different for each message in the set of control messages, such that, during the filtering step, the current message and the previously processed message can be non-consecutive in the ordered subset of messages.

20 Claims, 2 Drawing Sheets

CONTROL MESSAGE PROCESSING METHOD

TECHNICAL FIELD

The present invention relates to the field of Pay-TV and more specifically to the field of video on demand wherein audio/video contents are transmitted for multimedia units to the homes of users who requested these contents. The invention refers to the processing of messages received by the multimedia units and in particular to the filtering of these messages.

PRIOR ART

In a well-known manner, contents or events available in the form of video on demand (VOD=Video on demand) are generally encrypted, so that they can be displayed or used only when the user has received the corresponding decryption key or keys. This allows assuring the provider that he is remunerated for the content he has supplied and that this latter is used only by people that are authorized to, without being redistributed to others.

These keys are often sent in the form of Entitlement control messages ECM. These are generally formed on one hand by a header and on the other hand by the encrypted key. The header comprises different data such as parity information in particular, this information being described in more detail below.

Keys contained in these control messages have a determined term of validity, which means that they allow decrypting a content corresponding to a predefined duration to view or use the event. This duration, so-called cryptoperiod is generally comprised between a few seconds, for instance 2 seconds, and some minutes.

The parity information is modified during each cryptoperiod in such a manner that in current use, the multimedia unit changes its decryption key each time a change of parity takes place.

In practice, each Entitlement control message ECM is repeated several times. This aims to avoid the fact that a user that changes a channel does not have to wait too long to have access to this channel content. In fact, before having access to the content of a channel or a determined event, it is necessary to obtain the key that allows decrypting this content. In practice, each control message can be repeated every 50 ms. It is clear that when identical messages are repeated, the parity information contained in this message does not change. The multimedia unit has a filter that carries out a test in particular on this parity information. If the channel does not change, as well as parity information, it means that the message has already been received previously. The multimedia unit will thus not process it. The filter thus blocks said message.

Otherwise, if the parity information changes for two consecutives messages, it means that the present message and the previous message do not concern the same cryptoperiod. The filter must thus allow this message to pass in order to be processed. In particular, decryption key or data allowing access to this key are extracted from this message. The parity information is thus used to distinguish control messages.

When one content is displayed in a "usual" way, i.e. at a usual and continuous speed, the use of parity in the control message operates perfectly. On the other hand, for new operating modes introduced by new services such as video on demand, in particular no continuous operating modes or at a speed different from usual speed, the content may not be decrypted anymore. This can occur in particular in the case of fast forward or fast backward.

In this case, for instance, when the fast forward enables a jump in such a manner as to pass from an even cryptoperiod to a cryptoperiod which is also even, without passing through the intermediate odd cryptoperiod, the decryption will not be possible anymore. The document WO 2004/071091 describes a process able to optimize the moving speed during the fast forward or backward. In this document, an "offset" is foreseen between the data stream and the control message stream. This offset is chosen in such a way that a new control message is sent slightly in the middle of the cryptoperiod. According to this document, it is however clear that it is not possible to jump a cryptoperiod, otherwise the content cannot be decrypted anymore.

It is also possible for the decryption not to be done anymore during a jump towards another part of the content. This kind of jump is managed by the insertion of chapters, which allows to move to a predetermined location of the content, this location not being chosen by the user, but introduced during the implementation of the content.

In the current systems, based on the determination of the parity of the control word contained in a message and on discrimination of the messages according to this parity, a jump of one or several full cryptoperiods cannot be operated. In fact, when jumping from an even message to another even message, the filter will consider that no change of message has occurred, but that it simply concerns a repetition of a message already received. The filter will thus eliminate this message. The system will attempt to decrypt the content with a false key and thereby it will not be possible to decrypt the latter.

The patent application WO 03/107665 describes a process, which permits determining the key to be used to access any portion of encrypted content. This process is particularly useful in the field of conditional access television, in fast forward or backward modes. According to this process, the encrypted data packets comprise an index. The control messages containing the keys to be used to access a data portion also comprise a corresponding index. The data packets are stored as well as the decryption keys and the index.

When a user wishes to access the content, the index associated to the content portion in question is read. This index is related to those of the keys. It thus allows the retrieval of the decryption key to use to access the content.

In this process, contents and keys are memorized before their use. Since the invention described in this patent application refers to registered content and not to transmitted content, this document does not receive a plurality of messages that it is necessary to filter. The patent application does not allow the resolution of the problem of filtering the messages.

Publications EP 1 447 983, WO 2004/032410 and US 2004/268117 are similar as they all concern registered and not broadcast contents. Thus they are not concerned with the filtering of multiple identical messages.

DISCLOSURE OF THE INVENTION

This invention aims to solve the problems of systems of the prior art by achieving a process whereby it is possible to recover in a safe way the key which has to be used to decrypt a given content transmitted for the attention of a plurality of users. The content used in the invention is a content encrypted in advance and not in real time during its broadcasting.

Thus, it is not only possible to visualize the content in fast mode, for instance a visualized image each n cryptoperiods, with n>=2, but also to carry out jumps in any position of the content. In particular, it is possible to display an image ever two or four cryptoperiods for instance, without resulting in decryption problems.

This is much more interesting as there is a desire, for security reasons, to use cryptoperiods, which are increasingly shorter. This allows shortening the time available to fraudulent systems to determine the control word used for a determined part of an event.

In return, during the fast forward or backward, if there is a constraint to display at least one image per cryptoperiod, the reduction of this cryptoperiod involves a reduction of the possible speed of fast forward or backward.

Thank to the invention, since it is possible to unequivocally determine the key to use to access a determined part of the content, the need to display an image per cryptoperiod can be avoided and it is thus possible to have a fast speed independent from the duration of the cryptoperiod.

The aims of the invention are reached by a method for processing control messages from a set of control messages intended to access an encrypted content received in the form of a stream by a multimedia unit, these messages including at least a discrimination parameter having a different value for two consecutive messages in the stream and access data to encrypted content, the method comprising steps of:
    receiving a current control message,
    reading the discrimination parameter from the current control message,
    retrieving in a memory the discrimination parameter from message processed previously to the current message,
    comparing the current message discrimination parameter with the previously processed message discrimination parameter, and
    blocking said current control message by the filter if the comparison step indicates that the discrimination parameter of the current message is identical to the discrimination parameter of the previously processed message,
characterized in that the discrimination parameter is unique and different for each message of a subset of the ordered set of control messages, this subset containing at least three control messages and at the most all the control messages of the set of messages, in such a way that, during the filtering step, the current message and the previously processed message can be non-consecutive in the ordered subset of messages.

BRIEF DESCRIPTION OF THE DRAWINGS

This invention and its advantages will be better understood with reference to the enclosed drawings and to the detailed description of different embodiments of the invention, wherein.

EMBODIMENTS OF THE INVENTION

Figure 1:
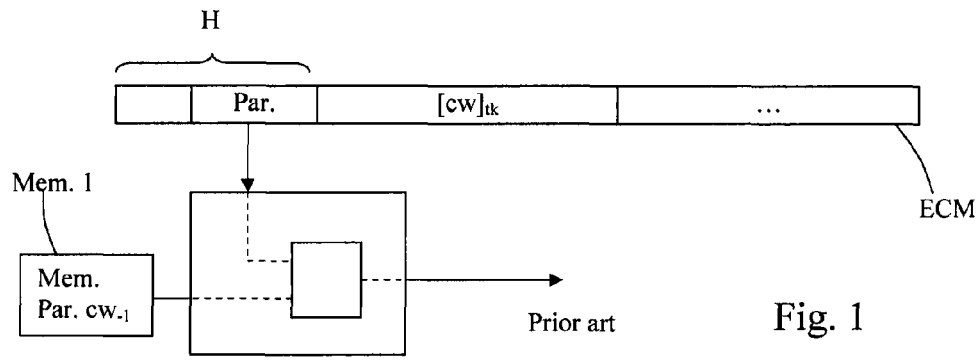
FIG. 1 shows the structure of a control message and the filtering of such a message according to prior art.

In reference to FIG. 1 describing the prior art, a control message ECM as used in particular in the field of Pay-TV notably comprises a header H, indicating in particular that the received message is a control message ECM, a parity information contained in this header, called Par. in the Figures, and a control word cw, generally encrypted by a transport key noted TK on this Figure. It should be noted that the control word cw could be replaced by information, which allows the determining of this control word, as it is explained in detail below. Such control message ECM also contains other data, in particular data relating to the fields lengths, identification data of these fields and a signature of the message, intended to guarantee its integrity.

When the filter receives an Entitlement control message ECM, it extracts from this the parity information. This can be extracted since it is always located in the same place in the control message. The filter thus acts on a determined part of the message, having a known length, corresponding to a "filtering depth".

If this filter has already received a message previously, the parity information of this previous message has been memorized in a memory Mem. 1. If no previous message has been received, the memory is empty. This memory is emptied for instance during each start-up and/or activation of the multimedia unit or furthermore during each channel change.

The parity information of the received message is compared to the memorized parity information. If these two parities are identical, the second message is blocked by the filter and thus is not processed. On the other hand, if the parity data is different or if the memory is empty, the filter allows the message to pass. This is processed in a conventional way, in particular for the extraction of the control word from this.

Figure 2:
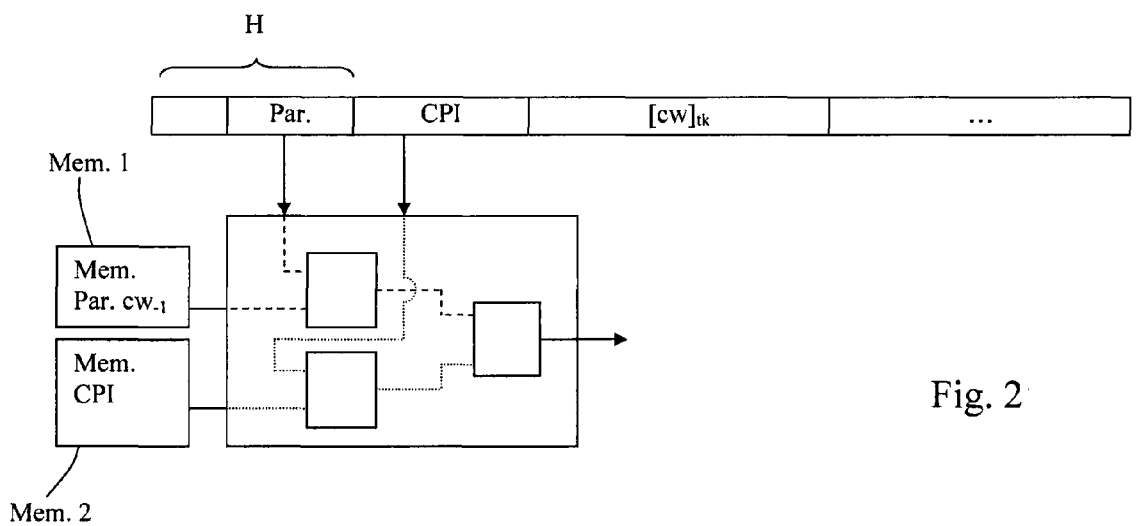
FIG. 2 shows the structure of a control message and the filtering of such a message according to the present invention.

FIG. 2 shows the treatment of a message according to this invention. This message comprises a header in which there is parity information as in the prior art. It comprises in addition a discrimination index CPI generally placed consecutively to the parity information. This index in particular can have the form of a counter value, which is modified in an incremental manner. According to one particular embodiment of the invention, the control messages associated to a similar event are put together in a set of messages. This unit is ordered since each control message contains data allowing access to a part of the event and the order of messages corresponds to the chronological order of parts of the event. Thus, two adjacent control messages in the set of messages correspond to two adjacent portions of the content when it is visualized in the chronological order.

The counter size is preferably such that the indicator of discrimination never uses the same value twice for control messages of the same subset of control messages. Such a subset contains at the minimum three control messages and can contain all the control messages associated to the same event. The counter size is equal to the length of discrimination index.

In principle, the number of different values that the counter can take is at least equal to the duration of the event divided by the duration of a cryptoperiod. It is also possible to provide a system wherein the counter can take the same value more than once, provided that these identical values correspond to contents distant in the time. In this case, two solutions are conceivable. Either jumps of an equal or greater duration are forbidden with respect to the duration of separating two contents corresponding to the same counter value, or they are allowed, while having the risk that the system is not totally reliable.

For instance this risk could be taken if the probability that content could not be decrypted is low. As an example, we can imagine a counter that could obtain 2048 different values, i.e. a length of the discrimination index CPI of 11 bits, and a cryptoperiod of 10 seconds, which corresponds to the maximum full duration of the event of 5 hours, 41 minutes and 20 seconds. If the event in question is longer than this duration and the user carries out a jump bigger than this duration, the system will no longer necessarily be able to access the content. It is relatively easy to organize oneself so that such an event has an extremely low probability of occurring.

According to a particular variant, it is possible to allow the index of discrimination to obtain the same value twice for messages of control associated with the same event, as far as the parity of these two messages is different. This can be achieved for instance by using an odd number of values for the counter and by increasing this value by 1 for each message while alternating the parity of the messages. In this case, we will refer to the parameter of discrimination for the combination of the parity and the discrimination index. Thus, even if the discrimination index has the same value twice, the parameter of discrimination is unique. This embodiment can present the advantage that with a reduced-sized counter, the number of messages can be high, which can be interesting when an event is particularly long.

Thus, for two messages having the counter value or a discrimination indicator of 356 for instance, one will be associated to an even parity and the other to an odd parity, which will allow to distinguish messages. By taking the previous example of a counter once more up to 2048 values and a cryptoperiod of 10 seconds, it will take more than 11 hours before two messages have the same counter value and the same parity, i.e. the same value of the discrimination parameter and thus they can be confused. According to the described embodiments above, it can be seen thus that the discrimination parameter can be the synonym of the index of discrimination or that it can be formed by combining the discrimination indicator and the parity information.

An event concerned with the current process can be for instance a film, a sport match, a musical file, but it can also be the totality of what is transmitted during a given period, for instance a day.

The process of the invention is described below assuming that the multimedia unit is started up from more than one cryptoperiod and that the user has not changed the channel. In this case, the memory, Mem. 1 contains the value of the associated parity to a control word $cw_{-1}$ coming from the previously processed message.

The multimedia unit includes in addition another memory noted Mem. 2 intended to memorize the value of the discrimination indication CPI from the previously processed message.

When the multimedia unit receives a control message ECM, the filter extracts the parity PAR from this current message. It compares this parity to that of the previously processed message, the parity of the previous message being stored in the corresponding memory Mem. 1. Parallel to this, the filter extracts the value from the discrimination index CPI of the current control message. This is achieved as in the case of parity, by determining the part of the control message ECM on which the filter must act.

It is also possible to filter simultaneously the parity and the discrimination index by modifying the filtering depth in such a way that this depth includes both parameters.

This finally filtered value of the discrimination index is compared to the value of the discrimination index that has been memorized in the corresponding memory Mem. 2. The result of these two comparisons, i.e. comparison of the parity and comparison of the value of the discrimination index, is processed for instance by means of a logic function, so as to block the messages whose discrimination index and parity are identical to the discrimination index and the parity of a previously processed message. In other words, a message having a discrimination parameter identical to the discrimination parameter of the previous message is blocked. It means that a message having the same parity as the previous message, but a different value of the index of discrimination can pass through the filter and will be processed in a conventional way. Likewise, a message having the same value of the index of discrimination that a previous message, but a different parity, will also be able to pass through the filter and be processed in a conventional way. In effect this message has a different discrimination parameter from the previous message.

It should be noted that the comparison criteria of messages are applied to a subset of a determined set of messages, this subset being for instance a part of all the messages related to the same event. The subset contains as a minimum three control messages resulting from the messages related to a determined event and at the most the totality of messages related to this event. Such a subset is extracted from the ordered set of messages. It is thus also ordered in the same way as the set from which it is extracted.

It must also be noted that in the context of the invention, when speaking about current message and previous message, the term "previous" means that the control message has been processed by the multimedia unit before the current message. It does not mean however that it concerns the message adjacent to the current message in the ordered set of messages. In fact, it is possible, for instance in a fast backward mode, for the current message to correspond to the $15^{th}$ cryptoperiod and for the previous message to correspond to the $17^{th}$ cryptoperiod In the embodiment disclosed in FIG. 3, the discrimination of messages is made only based on the index of discrimination and not on parity. As previously, when a message is received, the value of discrimination index CPI is extracted from this message and compared to the value of this index coming from the previously processed message. In this case too, the compared messages are only those coming from the same set of messages. If the compared value is identical to the memorized value, the filter blocks the message. On the other hand, if this value does not correspond to the memorized value, the message passes through the filter for being processed in a conventional way.

Figure 3:
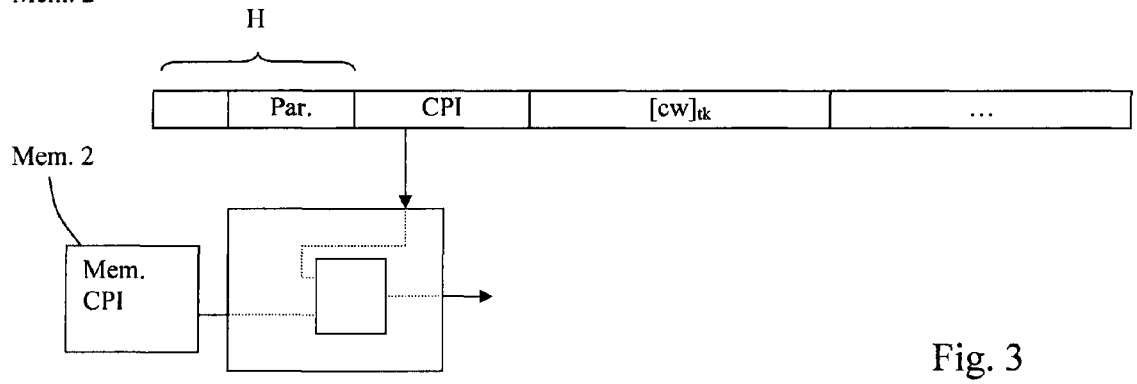
FIG. 3 represents a filtering variant of a message according to FIG. 2.

In FIG. 3, the control message is represented as including parity information. However it is also possible to suppress this parity information in the message and to include in the latter the discrimination index only. In practice however, this involves a modification of the structure of control messages, which is not necessarily desirable. In this embodiment, the discrimination index and the discrimination parameter are synonyms.

Figure 4:
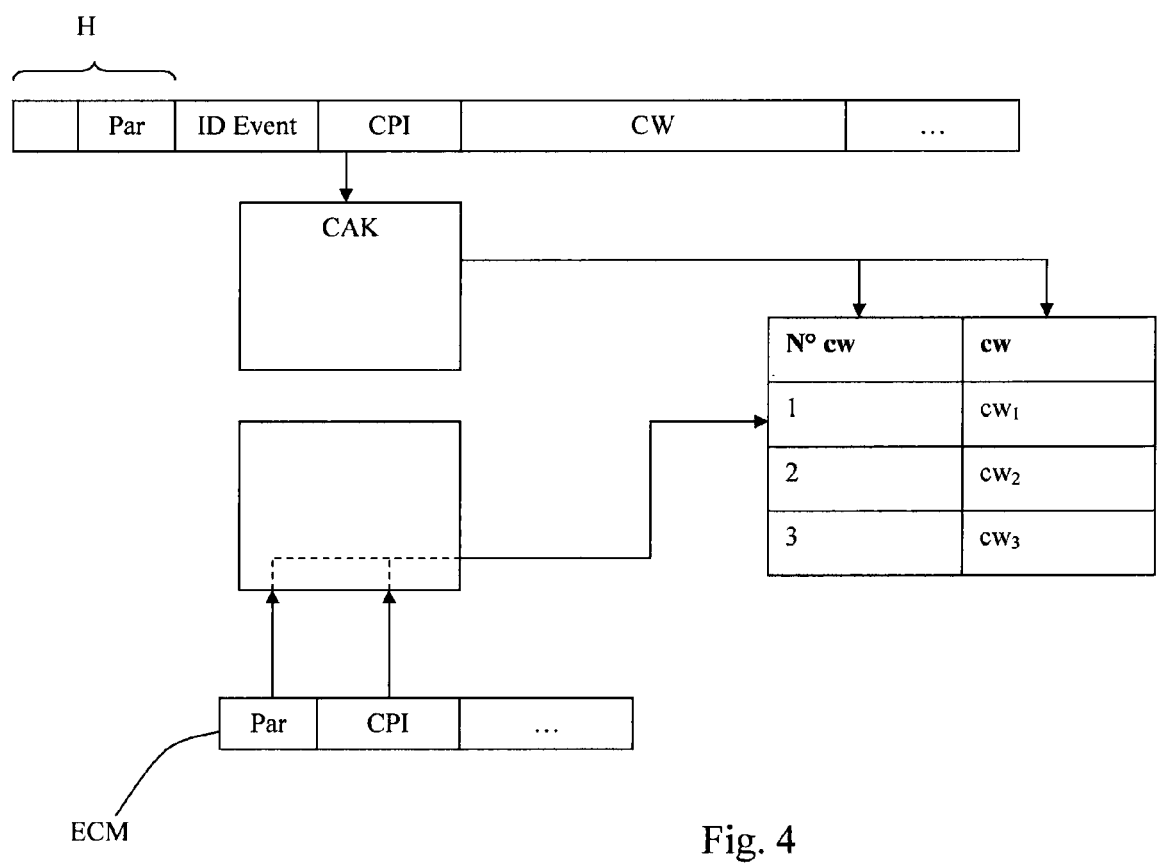
FIG. 4 shows another variant of the filtering method according to the invention.

In the embodiment of FIG. 4, in addition to the Entitlement control message ECM stream, a message packet containing the access conditions is sent to the encrypted content, i.e. either control words, or elements allowed to "construct" these control words. These message packets are generally sent in an asynchronous way with respect to the diffusion of audio/video data and can be sent very early in relation to their use. Messages of these packets contain in addition an index relating in an univocal way this index and the corresponding control word. In practice, this index is preferably the discrimination index CPI, although another index could be used. The received messages or at least the associated control words associated to the index can be memorized in the multimedia unit in view of their subsequent use.

The stream of control messages is formed by messages including parity information as well as a value of the discrimination index CPI. This stream is sent in a synchronous way with the sending of the content.

When the multimedia unit receives an Entitlement control message ECM containing the parity information and the discrimination index CPI, this message is filtered in the same manner that the filtering described in reference to FIGS. 2 and 3. The format of such a message is thus compatible with its filtering.

When such a message has been transmitted by the filter, i.e. has not been blocked, the system extracts from this the discrimination index value. This value is then used as a pointer in order to find the control word that has to be used. This is then searched for in the multimedia unit and used in a conventional way for decrypting the content. The format of messages of the message packet is thus compatible with their use for the access to encrypted content.

This embodiment offers increased security since a person who intercepts the control messages containing the index of discrimination in an illegal manner will not be able to use them without having also intercepted the table giving the control words. As control words can be sent before their use, it is possible to encrypt them in a robust manner, without jeopardising the processing quality and speed of the service.

The present invention allows access in a secure manner to any part of an encrypted content, without any risk that the content cannot be decrypted due to the fact that the control messages have been rejected mistakenly. This allows the user to obtain functions that it is not possible to offer with systems of prior art or not reliable, in particular fast forward or backward speeds greater than in the systems of prior art, even if cryptoperiods are particularly short. Moreover, jumps are possible in any place of an event, without any risk of decrypting the event.

The invention claimed is:

1. A method for processing control messages from a set of control messages intended to access an encrypted content received in the form of a stream by a multimedia unit of a user, the control messages to be processed including at least a discrimination parameter having a different value for non-redundant messages in the stream and data for accessing encrypted content, the method comprising steps of:
   receiving by the multimedia unit a current control message in a broadcast stream;
   reading in the multimedia unit a discrimination parameter from the current control message;
   retrieving in a memory of the multimedia unit a discrimination parameter from a control message processed previously to the current message;
   comparing the current message discrimination parameter with the previously processed message discrimination parameter; and
   eliminating during input processing of the received broadcast stream said current control message from the multimedia unit by a filter of the multimedia unit if the comparison step indicates that the discrimination parameter of the current message is identical to the discrimination parameter of the previously processed message;
   wherein the discrimination parameter is unique and different for each message of a non-redundant subset of the ordered set of control messages, this subset containing at least three control messages and at the most all the control messages of the set of messages, in such a way that, during the filtering step, the current message and the previously processed message can be non-consecutive in the ordered subset of messages.

2. The method for processing control messages according to claim 1, wherein said stream is a stream of video on demand and further comprising the step of allowing the user to navigate said stream forward and backward in fast modes and carry out jumps from one part of the content to another part of the content.

3. The method for processing control messages according to claim 1, wherein the discrimination parameter contains at least one discrimination index.

4. The method for processing control messages according to claim 1, wherein it comprises a prior reception step of a packet of messages, the messages of this packet containing said data for the access to the encrypted content, as well as an index related to these access data.

5. The method for processing control messages according to claim 1, wherein the memory storing values of discrimination parameters is emptied during each switching on and/or switching off of the multimedia unit and/or channel change.

6. The method for processing control messages according to claim 2, wherein the number of messages of said subset of messages is determined according to a maximum jump authorized in the content.

7. The method for processing control messages according to claim 3, wherein at least some of the control messages further comprise one parity information being part of the discrimination parameter and allowing to indicate a change of the control message from a current message to an adjacent message in said stream.

8. The method for processing control messages according to claim 3, wherein the comparison step is carried out by the multimedia unit on the parity information and on the value of the discrimination index and wherein the blocking step is carried out by the multimedia unit when the comparison between parity information and the discrimination index value leads to an identity.

9. The method for processing control messages according to claim 4, wherein said discrimination index is used as a pointer for the index related to data for the access to the encrypted content.

10. The method for processing control messages according to claim 9, wherein the messages of said packet of messages have a size compatible with their use for the access by the multimedia unit to the encrypted content and in that the messages of the set of control messages have a size compatible with their filtering by the multimedia unit.

11. A multimedia unit for processing control messages from a set of control messages intended to access an encrypted content received in the form of a stream, the control messages including at least a discrimination parameter having a different value for non-redundant messages in the stream and data for accessing encrypted content, the multimedia unit comprising:
   an input port for receiving an encrypted content stream and control messages;
   a filter connected to the input port;
   a memory connected to the filter;
   wherein the filter is configured to perform the steps of:
      receiving a current control message;
      reading a discrimination parameter from the current control message;
      retrieving in a memory a discrimination parameter from a control message processed previously to the current message;
      comparing the current message discrimination parameter with the previously processed message discrimination parameter; and
      eliminating during input processing of the received control messages said current control message from the multimedia unit by a filter if the comparison step indicates that the discrimination parameter of the current message is identical to the discrimination parameter of the previously processed message;

wherein the discrimination parameter is unique and different for each message of a non-redundant subset of the ordered set of control messages, this subset containing at least three control messages and at the most all the control messages of the set of messages, in such a way that, during the filtering step, the current message and the previously processed message can be non-consecutive in the ordered subset of messages.

12. The multimedia unit for processing control messages according to claim 11, wherein said stream is a stream of video on demand and further comprising the step of allowing the user to navigate said stream forward and backward in fast modes and carry out jumps from one part of the content to another part of the content.

13. The multimedia unit for processing control messages according to claim 11, wherein the discrimination parameter contains at least one discrimination index.

14. The multimedia unit for processing control messages according to claim 11, wherein it comprises a prior reception step of a packet of messages, the messages of this packet containing said data for the access to the encrypted content, as well as an index related to these access data.

15. The multimedia unit for processing control messages according to claim 11, wherein the memory storing values of discrimination parameters is emptied during each switching on and/or switching off of the multimedia unit and/or channel change.

16. The multimedia unit for processing control messages according to claim 12, wherein the number of messages of said subset of messages is determined according to a maximum jump authorized in the content.

17. The multimedia unit for processing control messages according to claim 13, wherein at least some of the control messages further comprise one parity information being part of the discrimination parameter and allowing to indicate a change of the control message from a current message to an adjacent message in said stream.

18. The multimedia unit for processing control messages according to claim 13, wherein the comparison step is carried out on the parity information and on the value of the discrimination index and wherein the blocking step is carried out when the comparison between parity information and the discrimination index value leads to an identity.

19. The multimedia unit for processing control messages according to claim 14, wherein said discrimination index is used as a pointer for the index related to data for the access to the encrypted content.

20. The multimedia unit for processing control messages according to claim 19, wherein the messages of said packet of messages have a size compatible with their use for the access to the encrypted content and in that the messages of the set of control messages have a size compatible with their filtering.

* * * * *